(12) United States Patent
Woods et al.

(10) Patent No.: US 8,612,693 B2
(45) Date of Patent: Dec. 17, 2013

(54) OPTIMIZED TRANSFER OF PACKETS IN A RESOURCE CONSTRAINED OPERATING ENVIRONMENT

(75) Inventors: Gregory K. Woods, Carlsbad, CA (US); Chinnappa K. Ganapathy, San Diego, CA (US); James William Dolter, San Diego, CA (US); Vito R. Bica, Poway, CA (US); Jared S. Grubb, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 12/573,660

(22) Filed: Oct. 5, 2009

(65) Prior Publication Data

US 2010/0241816 A1    Sep. 23, 2010

Related U.S. Application Data

(60) Provisional application No. 61/161,617, filed on Mar. 19, 2009.

(51) Int. Cl.
*G06F 12/02* (2006.01)

(52) U.S. Cl.
USPC .... 711/147; 711/154; 711/170; 711/E12.002; 711/E12.038

(58) Field of Classification Search
None
See application file for complete search history.

(56) References Cited

U.S. PATENT DOCUMENTS

| | | | |
|---|---|---|---|
| 5,293,487 A * | 3/1994 | Russo et al. | 709/250 |
| 5,687,169 A | 11/1997 | Fullerton | |
| 5,764,696 A | 6/1998 | Barnes et al. | |
| 5,812,081 A | 9/1998 | Fullerton | |
| 5,832,035 A | 11/1998 | Fullerton | |
| 5,889,781 A * | 3/1999 | Eftimakis et al. | 370/509 |
| 5,907,427 A | 5/1999 | Scalora et al. | |
| 5,952,956 A | 9/1999 | Fullerton | |
| 5,960,031 A | 9/1999 | Fullerton et al. | |
| 5,963,581 A | 10/1999 | Fullerton et al. | |
| 5,969,663 A | 10/1999 | Fullerton et al. | |
| 5,995,534 A | 11/1999 | Fullerton et al. | |
| 6,021,132 A | 2/2000 | Muller et al. | |
| 6,031,862 A | 2/2000 | Fullerton et al. | |
| 6,088,777 A | 7/2000 | Sorber | |
| 6,091,374 A | 7/2000 | Barnes | |
| 6,111,536 A | 8/2000 | Richards et al. | |
| 6,133,876 A | 10/2000 | Fullerton et al. | |
| 6,177,903 B1 | 1/2001 | Fullerton et al. | |
| 6,218,979 B1 | 4/2001 | Barnes et al. | |
| 6,295,019 B1 | 9/2001 | Richards et al. | |
| 6,297,773 B1 | 10/2001 | Fullerton et al. | |
| 6,300,903 B1 | 10/2001 | Richards et al. | |

(Continued)

OTHER PUBLICATIONS

International Search Report and Written Opinion—PCT/US10/028031, International Search Authority—European Patent Office, May 12, 2010.

(Continued)

*Primary Examiner* — Michael Krofcheck
(74) *Attorney, Agent, or Firm* — Paul S. Holdaway

(57) ABSTRACT

An apparatus includes first and second components, a memory, and an allocator configured to allocate a portion of the memory to the first component, wherein the first component is configured to access the allocated portion of the memory and to send information to the second component to provide the second component with access to the allocated portion of the memory.

50 Claims, 4 Drawing Sheets

(56) References Cited

U.S. PATENT DOCUMENTS

| | | |
|---|---|---|
| 6,304,623 B1 | 10/2001 | Richards et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Fullerton et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,684,363 B1 * | 1/2004 | Cassiday et al. ............... 714/776 |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,546 B1 * | 8/2004 | Epps et al. .................... 370/413 |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,931,581 B1 * | 8/2005 | Cassiday et al. ............... 714/758 |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,269,744 B1 * | 9/2007 | Shippy et al. ................. 713/193 |
| 7,271,779 B2 | 9/2007 | Hertel |
| 7,480,303 B1 | 1/2009 | Ngai |
| 2002/0069301 A1 * | 6/2002 | Fan et al. ....................... 709/253 |
| 2003/0117958 A1 * | 6/2003 | Nation et al. ................. 370/235 |
| 2003/0172138 A1 * | 9/2003 | McCormack et al. ........ 709/220 |
| 2004/0215955 A1 * | 10/2004 | Tamai et al. ................... 713/150 |
| 2005/0223184 A1 | 10/2005 | Russell et al. |
| 2006/0075057 A1 | 4/2006 | Gildea et al. |
| 2006/0123203 A1 * | 6/2006 | Suzuki ......................... 711/152 |
| 2007/0041342 A1 * | 2/2007 | Usuda et al. .................. 370/329 |
| 2008/0005437 A1 * | 1/2008 | Gupta et al. .................. 710/241 |
| 2009/0172393 A1 * | 7/2009 | Tanik et al. ................... 713/160 |
| 2010/0058256 A1 * | 3/2010 | El-Zein et al. ..................... 716/2 |

OTHER PUBLICATIONS

International Preliminary Report on Patentability—PCT/US2010/028031, The International Bureau of WIPO—Geneva, Switzerland, Jun. 7, 2011.

Taiwan Search Report—TW099108239—TIPO—Jul. 19, 2013.

* cited by examiner

OPTIMIZED TRANSFER OF PACKETS IN A RESOURCE CONSTRAINED OPERATING ENVIRONMENT

CROSS-REFERENCE TO RELATED APPLICATIONS

The present Application for Patent claims priority to Provisional Application No. 61/161,617 entitled "Optimized Transfer of Packets in a Resource Constrained Operating Environment" filed Mar. 19, 2009.

BACKGROUND

1. Field

The present disclosure relates generally to optimizing the transfer of packets in a resource constrained operating environment.

2. Background

Many electronic devices employ a central processing unit (CPU) to perform highly sophisticated and complex processing functions. An ARM (Advanced RISC Machine) processor is just one example of a CPU that is widely used today for mobile applications because of its efficient, low-power architecture. The CPU generally operates with system memory, which holds the software programs and data needed by the CPU to perform its functions.

Direct memory access (DMA) is a common feature that allows certain hardware subsystems within the electronic device to access system memory independently of the CPU. This is typically achieved with a DMA command issued by the CPU, which enables the DMA to copy a block of data from system memory to a buffer within the hardware subsystem, or vice versa. Because the DMA is executing the data transfer, the CPU is available to perform other operations while the transfer is in progress.

Although DMA has proven to be a useful feature, there are a number of disadvantages. The use of a memory in the hardware subsystem solely for buffering is expensive. This is especially true in packet-based communication devices where the quality of service (QoS) requirements may necessitate the buffering of the entire packet at numerous stages throughout the hardware subsystem. In such cases it may not be possible to reuse the same buffer memory for multiple hardware stages. In cases where the communication device is placed in an idle or disabled state for a specific period of time or a specific usage mode, it may not be possible to reuse the memory elsewhere in the device to enhance overall system capability or performance. In addition, the power consumed by a DMA transfer is undesirable in ultra-low power applications, such as those typically encountered in short range wireless communications.

SUMMARY

In one aspect of the disclosure, an apparatus includes first and second components, a memory, and an allocator configured to allocate a portion of the memory to the first component, wherein the first component is configured to access the allocated portion of the memory and to send information to the second component to provide the second component with access to the allocated portion of the memory.

In another aspect of the disclosure, an apparatus includes first and second components, a memory, and means for allocating a portion of the memory to the first component, wherein the first component comprises means for accessing the allocated portion of the memory and means for sending information to the second component to provide the second component with access to the allocated portion of the memory.

In yet another aspect of the disclosure, a method of sharing memory between first and second components includes allocating a portion of the memory to the first component, accessing the allocated portion of the memory by the first component, and sending information from the first component to the second component to provide the second component with access to the allocated portion of the memory.

In a further aspect of the disclosure, a computer-program product for enabling first and second components to share memory includes computer-readable medium comprising codes executable by at least one processor to allocate a portion of the memory to the first component to enable the first component to access the allocated portion of the memory, and enable the second component to access the allocated portion of the memory after the first component sends information to the second component.

In yet a further aspect of the disclosure, a headset includes first and second components, a memory, and an allocator configured to allocate a portion of the memory to the first component, wherein the first component is configured to access the allocated portion of the memory and to send information to the second component to provide the second component with access to the allocated portion of the memory, and wherein the first or second component comprises a transducer.

In yet another aspect of the disclosure, a watch includes first and second components, a memory, and an allocator configured to allocate a portion of the memory to the first component, wherein the first component is configured to access the allocated portion of the memory and to send information to the second component to provide the second component with access to the allocated portion of the memory, and wherein the first or second component comprises a user interface.

In yet a further aspect of the disclosure, a sensing device includes first and second components, a memory, and an allocator configured to allocate a portion of the memory to the first component, wherein the first component is configured to access the allocated portion of the memory and to send information to the second component to provide the second component with access to the allocated portion of the memory, and wherein the first or second component comprises a sensor.

It is understood that other aspects of the disclosure will become readily apparent to those skilled in the art from the following detailed description, wherein various aspects of heterogeneous wireless ad-hoc networks are shown and described by way of illustration. As will be realized, these aspects of the disclosure may be implemented in other and different configurations and its several details are capable of modification in various other respects. Accordingly, the drawings and detailed description are to be regarded as illustrative in nature and not as restrictive.

In accordance with common practice, some of the drawings may be simplified for clarity. Thus, the drawings may not depict all of the components of a given apparatus or method.

DETAILED DESCRIPTION

Various aspects of the invention are described more fully hereinafter with reference to the accompanying drawings. This invention may, however, be embodied in many different forms and should not be construed as limited to any specific structure or function presented throughout this disclosure. Rather, these aspects are provided so that this disclosure will be thorough and complete, and will fully convey the scope of the invention to those skilled in the art. Based on the teachings herein one skilled in the art should appreciate that the scope of the invention is intended to cover any aspect of the invention disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect of the invention disclosed herein may be embodied by one or more elements of a claim.

Several aspects of an apparatus will now be presented. These aspects will be presented with reference to a wireless node for short range communications. The wireless node includes a CPU and hardware subsystem that shares system memory to process packets for wireless transmission and reception. Configurable amounts of system memory are allocated to the CPU and the various components within the hardware subsystem as required. This arrangement allows for real time adjustment of memory resources based on the current packet size, the number of wireless channels, etc. It also avoids DMA copying, enabling a packet to traverse from the highest software layer down to the low level hardware using the same location in system memory.

Figure 1:
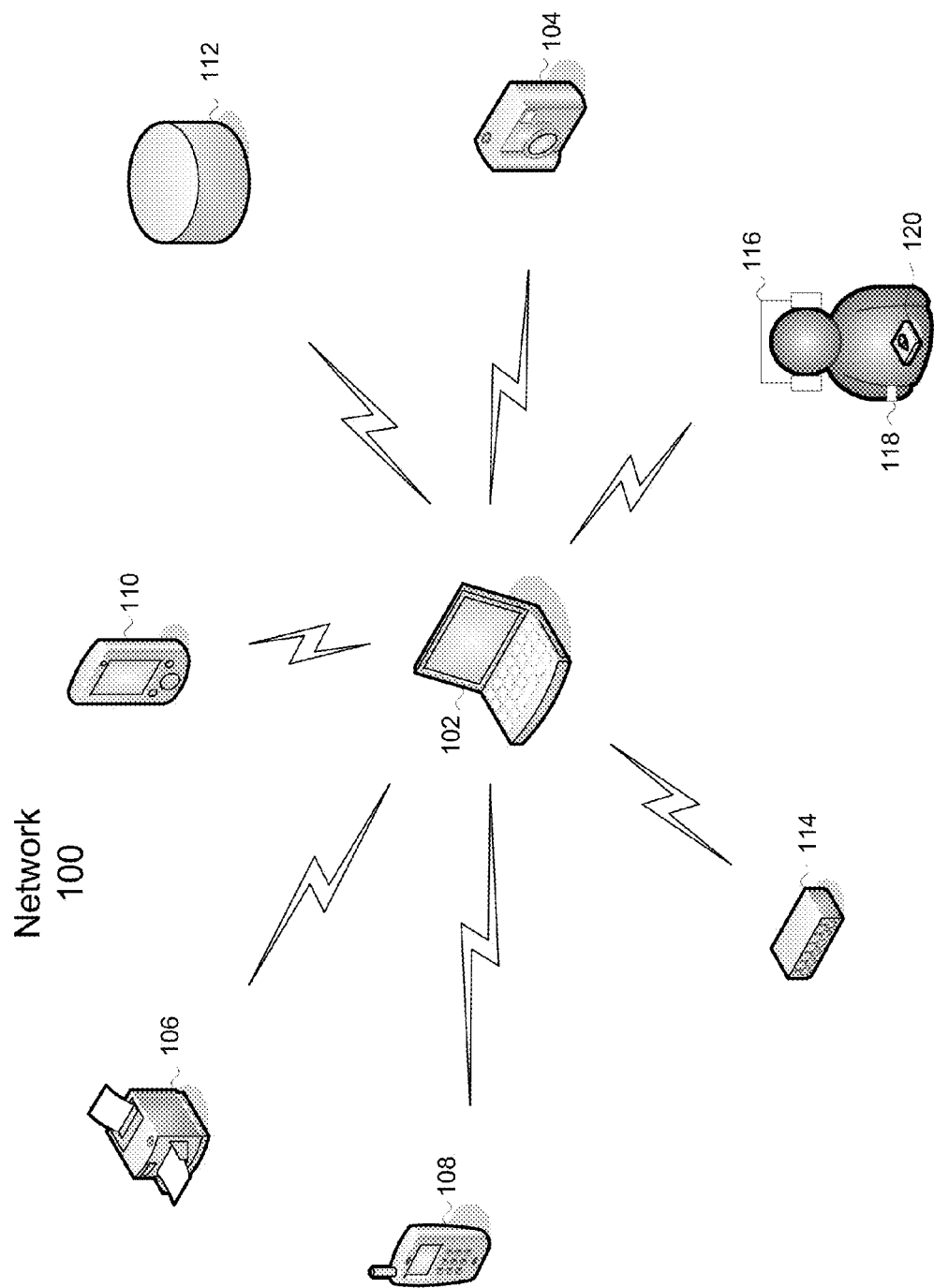
FIG. 1 is a conceptual diagram illustrating an example of a wireless network.

An example of a short range communications network suitable for supporting a wireless node embodying one or more aspects of the invention presented throughout this disclosure is illustrated in FIG. 1. The network 100 is shown with various wireless nodes that communicate using any suitable radio technology or wireless protocol. By way of example, the wireless nodes may be configured to support Ultra-Wideband (UWB) technology. Alternatively, the wireless nodes may be configured to support various wireless protocols such as Bluetooth or IEEE 802.11, just to name a few.

The network 100 is shown with a computer 102 in communication with the other wireless nodes. In this example, the computer 102 may receive digital photos from a digital camera 104, send documents to a printer 106 for printing, synch-up with e-mail on a personal digital assistant (PDA) 108, transfer music files to a digital audio player (e.g., MP3 player) 110, back up data and files to a mobile storage device 112, and communicate with a remote network (e.g., the Internet) via a wireless hub 114. The network 100 may also include a number of mobile and compact nodes, either wearable or implanted into the human body. By way of example, a person may be wearing a headset 116 (e.g., headphones, earpiece, etc.) that receives streamed audio from the computer 102, a watch 118 that is set by the computer 102, and/or a sensor 120 which monitors vital body parameters (e.g., a biometric sensor, a heart rate monitor, a pedometer, and EKG device, etc.). The sensor 120 transmits information from the body of the person to the computer 102 where the information may be forwarded to a medical facility (e.g., hospital, clinic, etc) via the wireless hub 114.

Although shown as a network supporting short range communications, a wireless node embodying any aspect of the invention presented throughout this disclosure may also be configured to support communications in a wide area network supporting any suitable wireless protocol, including by way of example, Evolution-Data Optimized (EV-DO), Ultra Mobile Broadband (UMB), Code Division Multiple Access (CDMA) 2000, Long Term Evolution (LTE), or Wideband CDMA (W-CDMA), just to name a few. Alternatively, the wireless node may be configured to support wired communications using cable modem, Digital Subscriber Line (DSL), fiber optics, Ethernet, HomeRF, or any other suitable wired access protocol.

A wireless node supporting any of the networks described above, or any other suitable wireless or wired network, stands to benefit from the various aspects of the invention presented throughout this disclosure because, among other things, the packet-based nature of the communications. However, as those skilled in the art will readily appreciate, these aspects may be extended to any other apparatus, system, method, process, device, product, or node that currently uses DMA to transfer data between two components or would benefit from a method of transferring data between two components using shared memory.

Figure 2:
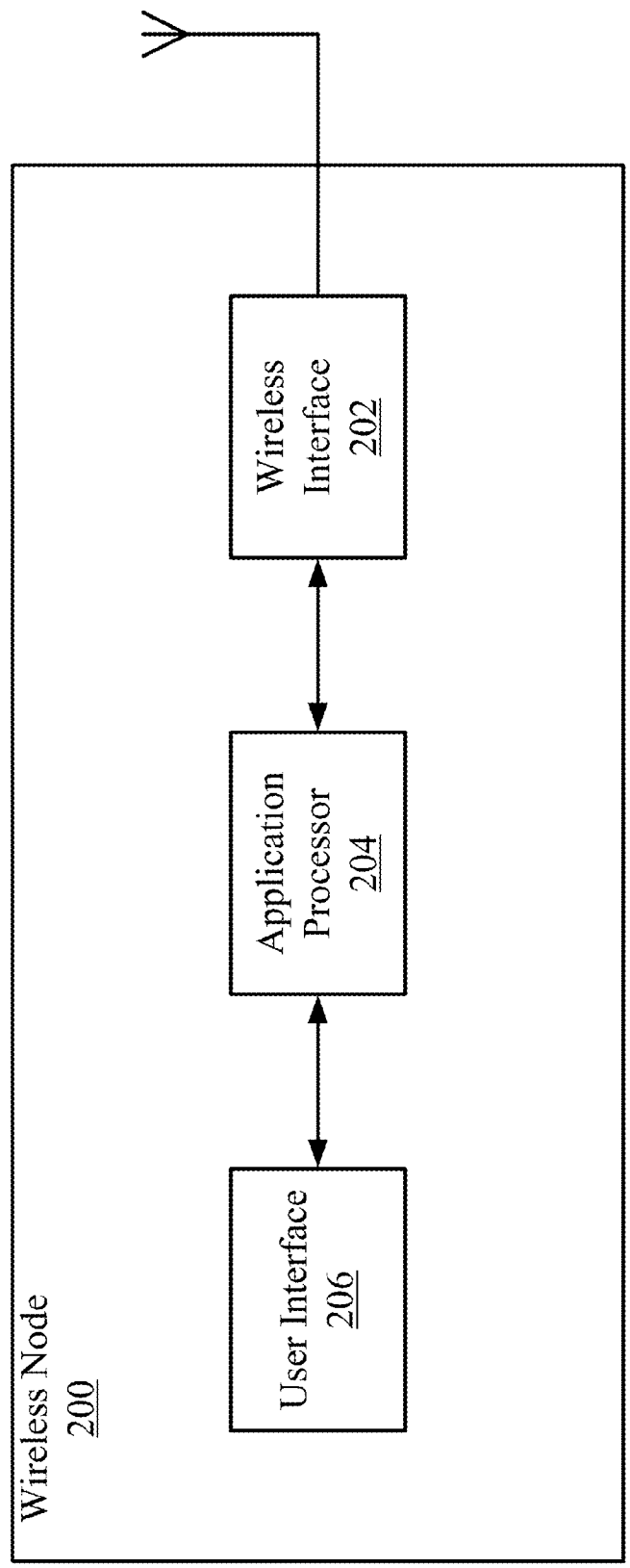
FIG. 2 is a conceptual diagram illustrating an example of a wireless node.

FIG. 2 is a conceptual block diagram of a wireless node. The wireless node 200 includes a wireless interface 202 configured to implement the protocol stack for the transmission medium. More specifically, the wireless interface 202 is responsible for implementing the physical layer by providing the means to transmit and receive data in accordance with the physical and electrical specifications required to interface to the transmission medium and the Medium Access Control (MAC) layer by managing access to the transmission medium. The wireless node 202 may provide other functionality including encryption/decryption, as well providing additional protocol layers (e.g., network layer, transport layer, etc.) that may be required for any particular application. Those skilled in the art will be readily able to implement the appropriate protocol for any wireless or wired node depending on the particular application and the overall design constraints imposed on the overall system.

The wireless node 200 also includes an application processor 204 that provides various data processing functions including, by way of example, speech and multimedia codecs and/or graphics processing. The application processor 204 may support a user interface 206. The user interface 206 may include a keypad, display, speaker, microphone, sensor, joystick, and/or any other combination user interface components.

Various inventive concepts will now be presented with reference to the wireless interface. The wireless interface may be implemented as an ASIC (Application Specific Integrated Circuit), or by some other suitable means. The ASIC may be used to implement the wireless interface alone, or in combination with any other circuitry in the wireless node (e.g. the application processor).

Figure 3:
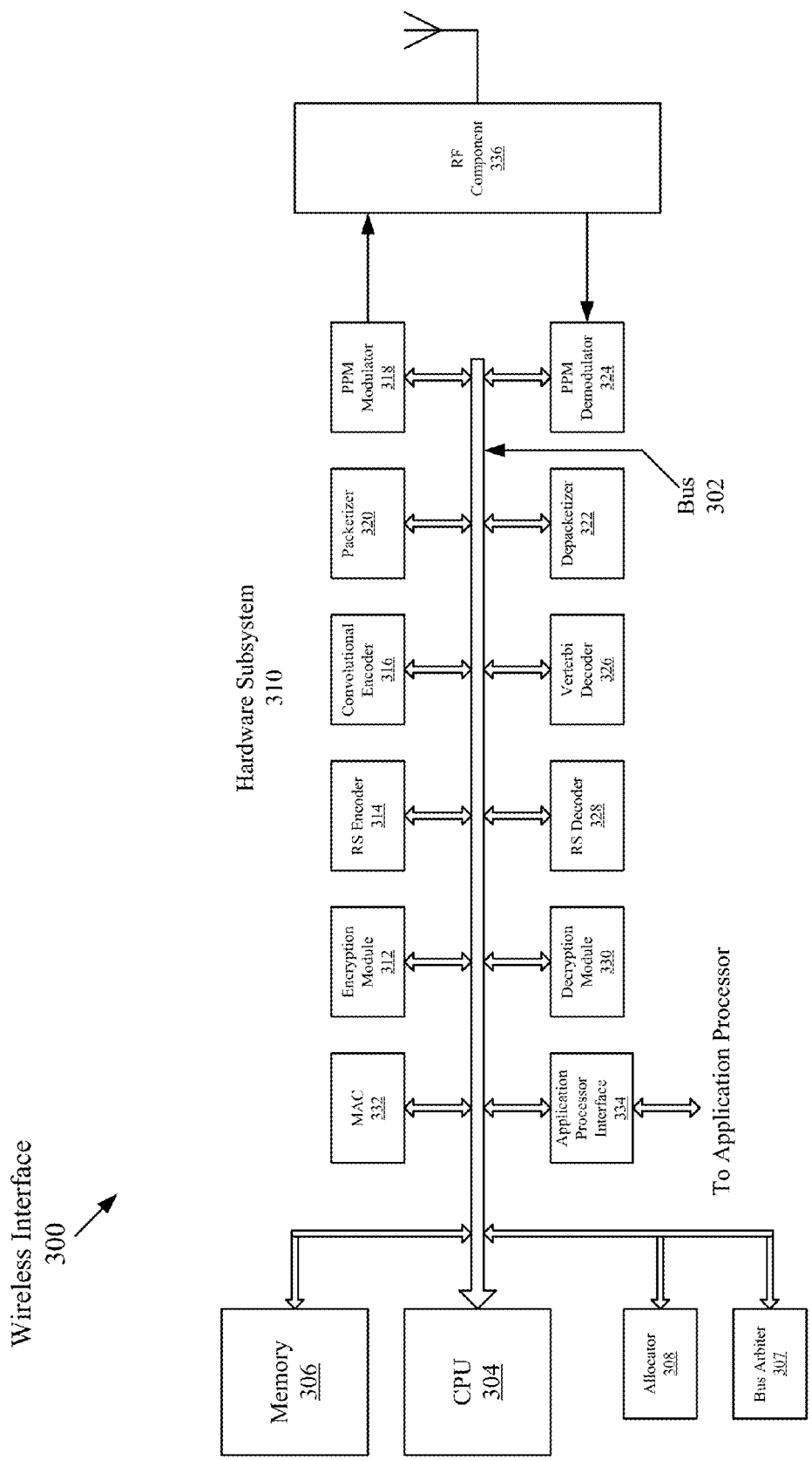
FIG. 3 is a conceptual diagram illustrating an example of a wireless interface for use in a wireless node.

One configuration of a wireless interface is shown in FIG. 3. The wireless interface 300 is shown with a bus architecture represented generally by a bus 302. The bus 302 may include any number of interconnecting buses and bridges depending on the specific application of the wireless interface 300 and the overall design constraints. The bus 302 links together various circuits including a Central Processing Unit (CPU) 304, memory 306, a bus arbiter 307, an allocator 308, and a hardware subsystem 310. The bus 302 may also link various other components such as timing sources, peripherals, voltage regulators, power management circuits, and the like, which are well known in the art, and therefore, will not be described any further.

The hardware subsystem 310 includes a transmit and receive channel. The transmit channel includes an encryption module 312, a Reed-Solomon (RS) encoder 314, a convolutional encoder 316, a constellation mapper 318, and a packetizer 320. The receiver channel includes a depacketizer 322, a constellation demapper 324, a Viterbi decoder 326, an RS decoder 328, and a decryption module 330. The hardware subsystem 310 also includes a MAC 332 and an application processor interface 334. An RF component 336 is connected to the transmit and receive channels of the hardware subsystem 310. The RF component 336 is used to modulate an RF carrier with data generated by the transmit channel. The RF component 336 is also used to recover data from an RF carrier transmitted by an another wireless node. The recovered data is provided by the RF component 336 to the receive channel.

The CPU 304 may be any suitable machine that can execute software. In one configuration of a wireless interface 300, the CPU is an embedded Advanced RISC (Reduced Instruction Set Computing) microprocessor commonly referred to in the industry as an ARM processor. The ARM processor is commonly used as a platform to run operating systems for wireless, consumer, imaging, automotive, industrial and networking applications. In other configurations, the CPU may be another type of microprocessor, a microcontroller, a Digital Signal Processor (DSP), or any other suitable general-purpose or special-purpose processor capable of providing a platform for executing software.

The memory 306 holds the software required by the CPU 304 to perform its functions. Software shall be construed broadly to mean instructions executable by the CPU, whether referred to as software, firmware, middleware, microcode, hardware description language, or otherwise. The memory 306 also holds data that is required by the CPU 304 and the hardware subsystem 310. As will be discussed in greater detail later, the memory serves as the MAC packet transport mechanism for the CPU 304 and the hardware subsystem 310 within the wireless interface 300. Access to the memory 306 is accomplished through the bus 302 with access on a priority/fairness basis being enforced by the bus arbiter 307.

The memory 306 may be implemented with RAM (Random Access Memory), DRAM (Dynamic RAM), SDRAM (Synchronous DRAM), SRAM (Static RAM), cache, general register files in the CPU 304, or any other suitable storage device that can be written to and read from by one or more components within the wireless interface 300. The memory 306 may be implemented with a single component or multiple components. The memory 306 may reside in the wireless interface 300, or alternatively, any portion of the memory 306 may be external to the wireless interface 300. Those skilled in the art will be readily able to design the memory with a suitable architecture for any particular application depending on the overall design constraints imposed on the system and/or other pertinent factors.

A sending component in the wireless interface 300 transfers data by writing the data to an allocated portion of the memory 306 and then sending a pointer to a receiving component to provide the receiving component with access to the allocated portion of the memory 306. The pointer includes the location and the size of the allocated portion of the memory 306. Prior to sending the data, the sending component requests an allocation of a portion of memory from the allocator 308, whose role is to allocate empty memory portions to components upon request. The component with the pointer has access to the allocated portion of the memory 306. Thus, once the sending component writes the data into the allocated portion of the memory 306 and transfers the pointer, the receiving component is given access to the allocated portion of the memory. The receiving component can now access the data, process it, write the processed data back to the allocated portion of the memory, and determine which component in the wireless interface will have access to the processed data by sending the pointer to that component.

The memory 306, or a portion thereof, is divided into multiple blocks, referred to as buffers. The buffers are configurable in terms of size. A configuration manager initializes the buffers at startup and then hands off real-time buffer allocation responsibility to the allocator 308. The configuration manager may be implemented as software that is executed by the CPU 304. The software may be stored in the memory 306 of the wireless interface 300, in memory external to the wireless interface, or distributed between the two. Alternatively, the configuration manager may be implemented as a hardware component in the wireless interface. In one configuration of a wireless node, the configuration manager may be implemented in its entirety outside the wireless interface 300. By way of example, the configuration manager may be implemented by the application processor 204 (see FIG. 2) or by some other entity in the wireless node.

The allocator 308 is shown residing in the wireless interface 300, but it too may be implemented in whole or part external to the wireless interface 300. The allocator 308 is shown as a hardware component, but may be implemented in software executed by the CPU or some other hardware platform residing either inside or outside the wireless interface. Similar to the configuration manager, the software may be stored in the memory 306 of the wireless interface 300, in memory external to the wireless interface, or distributed between the two.

In the transmit mode, the CPU 304 requests a buffer in the memory 306 from the allocator 308. The allocator 308 configures and allocates a buffer to the CPU 304 by transferring a pointer to the CPU 304. Once the pointer is received, the CPU 304 generates a data packet for transmission to another wireless node. The CPU writes the data packet into the buffer and sends the pointer to the MAC 332 to provide the MAC 332 with access to the buffer.

The MAC 332 uses the pointer to retrieve the portion of the data packet necessary to perform MAC layer processing. The ability of the MAC 332 to avoid retrieving the entire data packet may be advantageous in terms of reduced power consumption. The MAC 332 also creates a portion of MAC header and writes it to the buffer. The remaining portion of the MAC header is written to the buffer by the CPU 304. The MAC header together with the data packet (i.e., MAC payload) constitutes a MAC packet. The MAC 332 then sends the pointer to the encryption module 312 to provide the encryption module 312 with access to the buffer.

The encryption module 312 uses the pointer to retrieve the MAC packet in the buffer. The encryption module 312 then computes a MIC (Message Integrity Code) and a CRC (Cyclic Redundancy Check) and adds them to the MAC packet. The MIC allows the receiving wireless node to authenticate the transmission and the CRC provides for error detection. The MAC packet, or a portion thereof (e.g., the MAC payload), is then encrypted with an encryption algorithm using a key that is shared with the wireless node receiving the transmission.

In this example, physical layer processing of a MAC packet includes RS encoding, convolutional encoding, packetizing, and pulse position modulation (PPM). The RS encoder 314 and the convolutional encoder 316 add redundant information to the MAC packet. This redundancy may be used by the receiving node to correct errors in the transmission due to disturbances in the wireless channel. The encoded MAC packet is then provided to the packetizer 320. The packetizer 320 creates the physical layer packet. The physical layer packet includes the MAC packet which constitutes the physical layer payload. The packetizer 320 creates a physical layer preamble and appends the physical layer payload to the preamble to create a physical layer packet. The physical layer packet is then modulated using PPM before being transmitted.

In one configuration of a wireless interface 300, the physical layer processing is performed without the use of the buffer. The MAC packet from the encryption module 312 is provided directly to the RS encoder and then passed through the convolutional encoder 316 and the packetizer 320 to the modulator 318. Alternatively, the MAC packet may be retrieved separately for physical layer processing by RS encoder 314, convolutional encoder 316, the packetizer 320, and the modulator 318 by transferring the pointer between them.

In the receive mode, the RF component 336 recovers a physical layer packet from the transmission and provides it to the demodulator 324. The demodulated physical layer packet is then provided to the depacketizer 322. The depacketizer 322 strips the physical layer preamble from the physical layer packet before decoding the payload (i.e., MAC packet).

The decoding of the payload involves the inverse signal processing functions performed by the transmitting node. In this example, the redundant information in the MAC packet is used by the Viterbi decoder 326 and the RS decoder 328 to correct any transmission errors in the MAC packet. Similar to the physical layer processing in the transmit channel, the MAC packet is passed through the various physical layer processing components without the use of the buffer. However, in an alternative configuration of the wireless interface 300, the MAC packet may be retrieved separately by the demodulator 324, depacketizer 322, Viterbi decoder 326, and the RS decoder 328 by transferring the pointer between them.

Once the physical layer processing is complete, the MAC packet is provided to the decryption module 330. The decryption module 330 decrypts the MAC packet. Once decrypted, the MIC and CRC are checked. Next, the decryption module 330 requests a buffer in the memory 306 from the allocator 308. The allocator 308 configures and allocates a buffer to the decryption module 330 by transferring a pointer to the decryption module 330. Once the pointer is received, the decryption module 330 writes the MAC packet to the buffer and then provides the pointer to the MAC 332. The MAC 332 uses the pointer to retrieve the portion of the MAC packet necessary to perform MAC layer processing. Once complete, the MAC 332 provides the pointer to the CPU 304. The CPU 304 may use the pointer to access the MAC payload (i.e., data packet) in the buffer and perform further processing.

Figure 4:
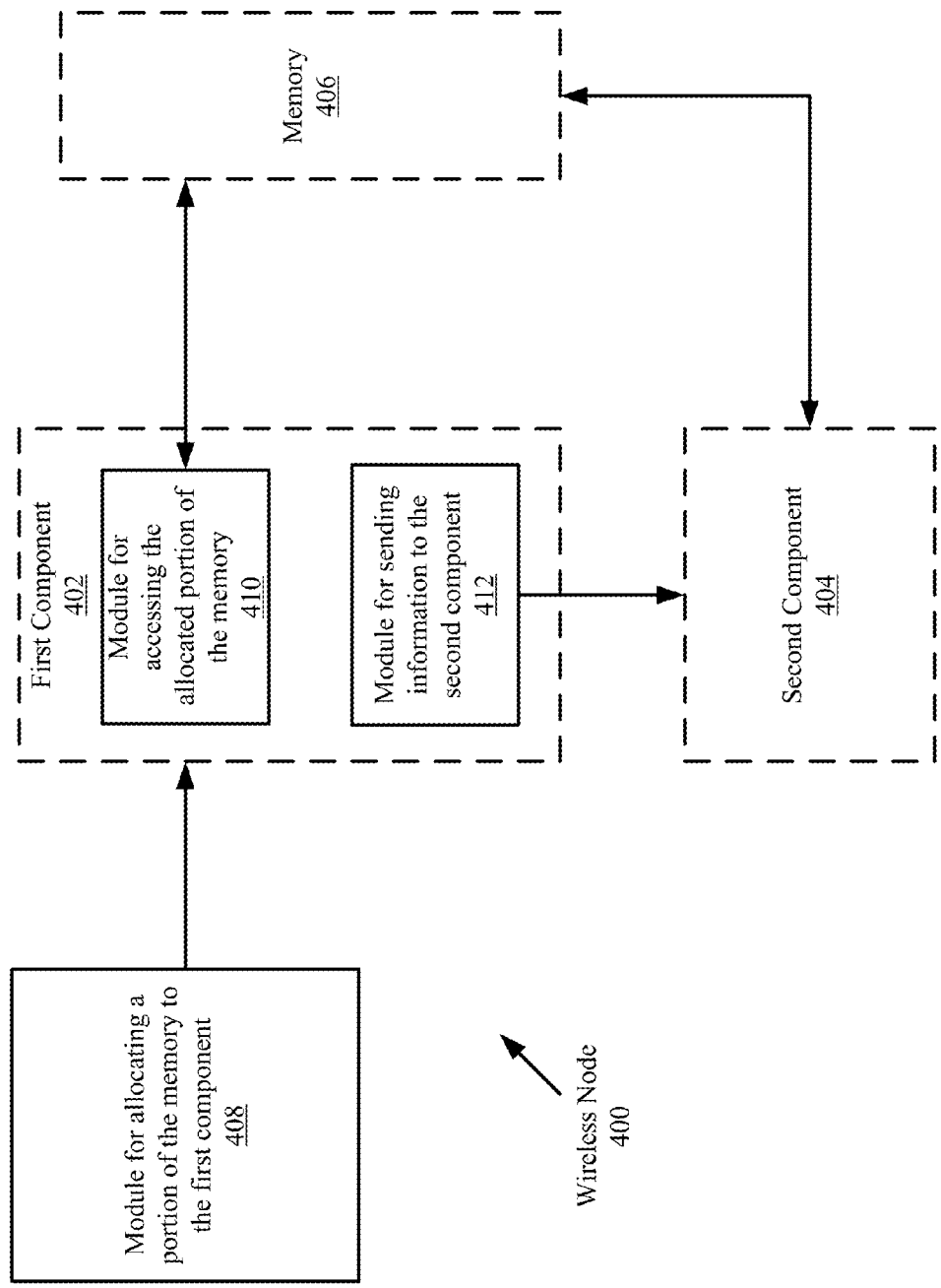
FIG. 4 is a conceptual diagram illustrating an example of the functionality of a wireless interface for use in a wireless node.

FIG. 4 is a conceptual diagram illustrating an example of the functionality of a wireless interface for use in a wireless node. In this example, a wireless node 400 includes first and second components 402, 404 and a memory 406. The wireless node 400 further includes a module 408 for allocating a portion of the memory to the first component. The first component 402 includes a module 410 for accessing the allocated portion of the memory 406 and a module 412 for sending information to the second component 404 to provide the second component 404 with access to the allocated portion of the memory 406.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for constructing or deconstructing a data packet, comprising:
   first, second, and third components;
   a memory; and
   an allocator configured to allocate a portion of the memory to the first component;
   wherein the first component is configured to:
      access the allocated portion of the memory;
      store at least a portion of the data packet in the allocated portion of the memory;
      send information to the second component to provide the second component with access to the at least a portion of the data packet from the allocated portion of the memory; and
   wherein the second component is configured to:
      retrieve the at least portion of the data packet stored in the allocated portion of the memory using the information, wherein the at least portion of the data packet comprises a data payload of the data packet;
      modify the at least portion of the data packet to construct or deconstruct the data packet;
      store the modified at least portion of the data packet in the allocated portion of the memory; and
      provide the third component with access to the stored modified at least portion of the data packet.

2. The apparatus of claim 1 wherein the allocator is further configured to determine location and size of the portion of the memory allocated to the first component.

3. The apparatus of claim 1 wherein the allocator allocates the portion of the memory to the first component by sending the first component the information.

4. The apparatus of claim 1 wherein the first component sends data to the second component by writing the data to the allocated portion of the memory.

5. The apparatus of claim 1 wherein the first component surrenders access to the allocated portion of the memory by sending the information to the second component.

6. The apparatus of claim 1 wherein the information comprises location and size of the portion of the memory allocated to the first component.

7. The apparatus of claim 1 wherein the allocator is further configured to map the first component to the portion of the memory allocated to the first component.

8. The apparatus of claim 1 wherein the allocator is further configured to allocate portions of the remaining memory to other components.

9. The apparatus of claim 8 further comprising a configuration manager configured to initialize the allocator to initially define by location and size the portion of the memory allocated to the first component and the portions of the remaining memory allocated to the other components.

10. The apparatus of claim 9 wherein the allocator is further configured to change the location and size of the portion of the memory allocated to the first component and the portions of the remaining memory allocated to the other components.

11. The apparatus of claim 1 wherein one of the first and second components comprises a hardware subsystem and the other one of the first and second components comprises a platform for executing software.

12. The apparatus of claim 11 wherein the hardware subsystem comprises a component configured for physical layer processing and the platform for executing software comprises a central processing unit.

13. The apparatus of claim 1 wherein the second component is further configured to modify the at least portion of the data packet by creating at least a first portion of a media access controller (MAC) header for the data packet and adding the created first portion to the at least portion of the data packet by writing the first portion to the allocated portion of the memory.

14. The apparatus of claim 13 wherein the first component is further configured to modify the at least portion of the data packet by creating at least a second portion of the media access controller (MAC) header for the data packet and adding the created second portion to the data packet by writing the second portion to the allocation portion of the memory.

15. The apparatus of claim 1 wherein the third component is configured to:
retrieve at least another portion of the modified data packet stored in the allocated portion of the memory;
encrypt the at least another portion of the data packet to construct the data packet;
store the encrypted at least another portion of the data packet in the allocated portion of the memory; and
provide a fourth component of the apparatus with access to the encrypted data packet.

16. The apparatus of claim 15 wherein the forth component is configured to:
retrieve at least a third portion of the encrypted data packet stored in the allocated portion of the memory;
perform error correction encoding of the at least third portion of the encrypted data packet to construct the data packet;
store the encoded at least third portion of the data packet in the allocated portion of the memory; and
provide a fifth component of the apparatus with access to the encoded data packet.

17. The apparatus of claim 16 wherein the fifth component is configured to:
retrieve at least a forth portion of the encoded data packet stored in the allocated portion of the memory; and
perform physical layer packetizing of the encoded data packet to construct the data packet;
store the packetized physical layer data packet in the allocated portion of the memory; and
provide a sixth component of the apparatus with access to the packetized physical layer data packet.

18. The apparatus of claim 17 wherein the fifth component is configured to:
retrieve at least a fifth portion of the packetized physical layer data packet stored in the allocated portion of the memory; and
modulate a carrier with the at least fifth portion of the packetized physical layer data packet to construct the data packet.

19. The apparatus of claim 1 wherein the second component is configured to modify the at least portion of the data packet by performing physical layer depacketizing of the data packet in deconstructing the data packet.

20. The apparatus of claim 19 wherein the third component is configured to:
retrieve at least a second portion of the depacketized data packet stored in the allocated portion of the memory;
perform error correction decoding of the at least second portion of the depacketized data packet to deconstruct the data packet;
store the decoded at least second portion of the data packet in the allocated portion of the memory; and
provide a forth component of the apparatus with access to the decoded data packet.

21. The apparatus of claim 20 wherein the forth component is configured to:
retrieve at least a third portion of the decoded data packet stored in the allocated portion of the memory;
perform decryption of the at least third portion of the data packet to deconstruct the data packet;
store the decrypted at least third portion of the data packet in the allocated portion of the memory; and
provide a fifth component of the apparatus with access to the decrypted data packet.

22. The apparatus of claim 21 wherein the fifth component is configured to:
retrieve at least a forth portion of the decrypted data packet stored in the allocated portion of the memory; and
perform MAC layer processing to deconstruct the data packet.

23. An apparatus for constructing or deconstructing a data packet, comprising:
means for allocating a portion of a memory to a first component;
means for accessing the allocated portion of the memory by the first component to store at least a portion of the data packet in the allocated portion of the memory;
means for sending information from the first component to the second component to provide the second component with access to the allocated portion of the memory; and
means for modifying the at least portion of the data packet by the second component to construct or deconstruct the data packet.

24. The apparatus of claim 23 further comprising means for determining location and size of the portion of the memory allocated to the first component.

25. The apparatus of claim 23 wherein the means for allocating a portion of the memory to the first component allocates the portion of the memory by sending the first component the information.

26. The apparatus of claim 23 further comprising means for sending data from the first component to the second component, wherein the data is sent by the first component writing the data to the allocated portion of the memory.

27. The apparatus of claim 23 further comprising means for surrendering access to the allocated portion of the memory by sending the information to the second component.

28. The apparatus of claim 23 wherein the information comprises location and size of the portion of the memory allocated to the first component.

29. The apparatus of claim 23 further comprising means for mapping the first component to the portion of the memory allocated to the first component.

30. The apparatus of claim 23 further comprising means for allocating portions of the remaining memory to other components.

31. The apparatus of claim 30 further comprising means for initially defining by location and size the portion of the memory allocated to the first component and the portions of the remaining memory allocated to the other components.

32. The apparatus of claim 31 further comprising means for changing the location and size of the portion of the memory allocated to the first component and the portions of the remaining memory allocated to the other components.

33. The apparatus of claim 23 wherein one of the first and second components comprises a hardware subsystem and the other one of the first and second components comprises a platform for executing software.

34. The apparatus of claim 33 wherein the hardware subsystem comprises a component configured for physical layer processing and the platform for executing software comprises a central processing unit.

35. A method of constructing or deconstructing a data packet by sharing memory between first, second, and third components, comprising:
   allocating a portion of the memory to the first component;
   accessing the allocated portion of the memory by the first component;
   the first component storing at least a portion of the data packet in the allocated portion of the memory;
   sending information from the first component to the second component to provide the second component with access to the stored at least portion of the data packet from the allocated portion of the memory;
   the second component retrieving the stored at least portion of the data packet using the information, wherein the at least portion of the data packet comprises a data payload of the data packet;
   the second component modifying the at least portion of the data packet to construct or deconstruct the data packet;
   the second component storing the modified at least portion of the data packet in the allocated portion of the memory; and
   the second component providing the third component with access to the stored modified data packet.

36. The method of claim 35 further comprising determining location and size of the portion of the memory allocated to the first component.

37. The method of claim 35 wherein the portion of the memory is allocated to the first component by sending the first component the information.

38. The method of claim 35 further comprising sending data from the first component to the second component, wherein the data is sent by the first component writing the data to the allocated portion of the memory.

39. The apparatus of claim 35 wherein the first component surrenders access to the allocated portion of the memory by sending the information to the second component.

40. The method of claim 35 wherein the information comprises location and size of the portion of the memory allocated to the first component.

41. The method of claim 35 further comprising mapping the first component to the portion of the memory allocated to the first component.

42. The method of claim 35 further comprising allocating portions of the remaining memory to other components.

43. The method of claim 42 further comprising initially defining by location and size the portion of the memory allocated to the first component and the portions of the remaining memory allocated to the other components.

44. The method of claim 43 further comprising changing the location and size of the portion of the memory allocated to the first component and the portions of the remaining memory allocated to the other components.

45. The method of claim 35 wherein one of the first and second components comprises a hardware subsystem and the other one of the first and second components comprises a platform for executing software.

46. The method of claim 45 wherein the hardware subsystem comprises a component configured for physical layer processing and the platform for executing software comprises a central processing unit.

47. A computer-program product for enabling first, second, and third components to share memory for constructing and deconstructing a data packet, comprising:
   non-transitory computer-readable medium storing codes executable by at least one processor to:
      allocate a portion of the memory to the first component to enable the first component to;
      access the allocated portion of the memory;
      store at least a portion of the data packet in the allocated portion of the memory; and
      send information to the second component to provide the second component with access of the at least a portion of the data packet from the allocated portion of the memory; and
   enable the second component to:
      retrieve the at least portion of the stored data packet using the information, wherein the at least portion of the data packet comprises a data payload of the data packet;
      modify the at least portion of the data packet to construct or deconstruct the data packet;
      store the modified at least portion of the data packet in the allocated portion of the memory; and
      provide the third component with access to the stored modified at least portion of the data packet.

48. A headset, comprising:
   first, second, and third components;
   a memory; and
   an allocator configured to allocate a portion of the memory to the first component;
   wherein the first component is configured to:
      access the allocated portion of the memory;
      store at least a portion of a data packet in the allocated portion of the memory;
      send information to the second component to provide the second component with access to the at least portion of the data packet from the allocated portion of the memory;

wherein the second component is configured to:
  retrieve the at least portion of the data packet stored in the allocated portion of the memory using the information, wherein the at least portion of the data packet comprises a data payload of the data packet;
  modify the at least portion of the data packet to construct or deconstruct the data packet;
  store the modified at least portion of the data packet in the allocated portion of the memory; and
  provide the third component with access to the stored modified at least portion of the data packet; and
a transducer configured to generate data of the data packet.

49. A watch comprising:
first, second, and third components;
a memory; and
an allocator configured to allocate a portion of the memory to the first component;
wherein the first component is configured to:
  access the allocated portion of the memory;
  store at least a portion of a data packet in the allocated portion of the memory;
  send information to the second component to provide the second component with access to the at least a portion of the data packet from the allocated portion of the memory; and
wherein the second component is configured to:
  retrieve the at least portion of the data packet stored in the allocated portion of the memory using the information, wherein the at least portion of the data packet comprises a data payload of the data packet;
  modify the at least portion of the data packet to construct or deconstruct the data packet;
  store the modified at least portion of the data packet in the allocated portion of the memory; and
  provide the third component with access to the stored modified at least portion of the data packet; and
a user interface configured to capture data of the data packet.

50. A sensing device, comprising:
first, second, and third components;
a memory; and
an allocator configured to allocate a portion of the memory to the first component;
wherein the first component is configured to:
  access the allocated portion of the memory;
  store at least a portion of a data packet in the allocated portion of the memory;
  send information to the second component to provide the second component with access to the at least a portion of the data packet from the allocated portion of the memory; and
wherein the second component is configured to:
  retrieve the at least portion of the data packet stored in the allocated portion of the memory using the information, wherein the at least portion of the data packet comprises a data payload of the data packet;
  modify the at least portion of the data packet to construct or deconstruct the data packet;
  store the modified at least portion of the data packet in the allocated portion of the memory; and
  provide the third component with access to the stored modified at least portion of the data packet; and
a sensor configured to generate data of the data packet.

* * * * *